United States Patent [19]

Bieck

[11] Patent Number: 5,598,925
[45] Date of Patent: Feb. 4, 1997

[54] HOLDER FOR A SOUND RECORDING MEDIUM HOUSING HAVING RATTLING NOISE PREVENTION MEANS

[75] Inventor: Torsten Bieck, Waldachtal, Germany

[73] Assignee: fischerwerke Artur Fischer GmbH & Co. KG, Waldachtal, Germany

[21] Appl. No.: 273,107

[22] Filed: Jul. 8, 1994

[30] Foreign Application Priority Data

Jul. 20, 1993 [DE] Germany .......................... 43 24 266.9

[51] Int. Cl.$^6$ .......................... B65D 85/672; A47B 81/06
[52] U.S. Cl. .................. 206/387.1; 206/387.12; 312/9.48; 312/9.57
[58] Field of Search .................. 206/387.1, 387.12; 312/9.16, 9.11, 9.19, 9.57, 9.56, 9.48, 9.53

[56] References Cited

U.S. PATENT DOCUMENTS

| | | | |
|---|---|---|---|
| 4,216,857 | 8/1980 | Huang | 206/387.12 |
| 4,428,480 | 1/1984 | Ackeret | 206/387.12 |
| 4,875,584 | 10/1989 | Ackeret | 206/387.12 |
| 4,890,735 | 2/1990 | Fukumoto . | |
| 5,215,212 | 6/1993 | Stephan | 206/387.12 |
| 5,303,993 | 4/1994 | Stephan et al. | 206/387.12 |
| 5,363,960 | 11/1994 | Ackeret | 206/387.12 |

FOREIGN PATENT DOCUMENTS

| | | | |
|---|---|---|---|
| 0538585 | 4/1993 | European Pat. Off. . | |
| 2556609 | 7/1976 | Germany . | |
| 2427105 | 5/1981 | Germany . | |
| 2427109 | 2/1988 | Germany . | |
| 3802008 | 7/1989 | Germany . | |
| 3904787 | 8/1990 | Germany . | |
| 4020163 | 1/1992 | Germany . | |
| 4039954 | 6/1992 | Germany . | |

*Primary Examiner*—Paul T. Sewell
*Assistant Examiner*—Marie Denise Patterson
*Attorney, Agent, or Firm*—Michael J. Striker

[57] ABSTRACT

The holder for a sound recording medium housing includes a base plate (1); a slider (2) mounted on the base plate (1) so as to be displaceable between a storage position and a removal position; a releasable locking device (17) for releasably locking the slider (2) in the storage position; a spring (8) for urging the slider (2) from the storage position to the removal position; and a clamping device for securing the sound recording medium housing on the slider (1) and preventing rattling noise due to motions including vibration. The clamping device includes an advantageously wedge-shaped clamp element (7) pivotally connected to the slider (2) and extending transversely across the slider (2), an actuating element (6) including a push rod extending in a travel direction of the slider (2) and displaceable relative to the slider for engagement with the wedge-shaped clamp element (7) and a device for pressing the actuating element (6) against the clamp element (7) to secure the sound recording medium housing to the slider so as to prevent rattling noise when the slider is in the storage position.

11 Claims, 3 Drawing Sheets

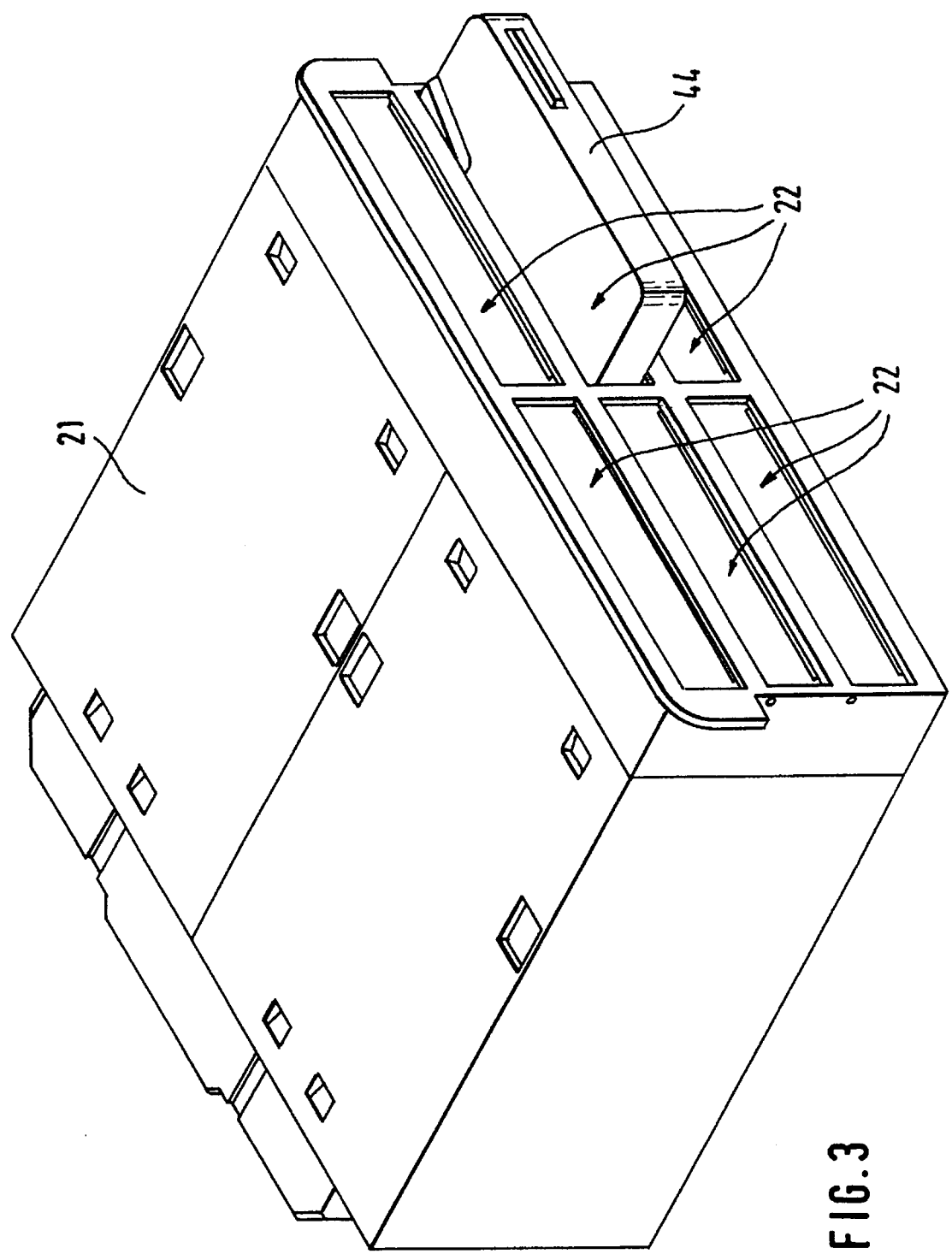

HOLDER FOR A SOUND RECORDING MEDIUM HOUSING HAVING RATTLING NOISE PREVENTION MEANS

BACKGROUND OF THE INVENTION

The present invention relates to a holder for a sound recording medium housing, especially a holder or container of a magnetic tape cassette having a clamping means for securing the cassette against vibrations.

Containers having cassette holders for storing magnetic tape cassettes are known in which the magnetic tape cassettes are held by a slider which can be inserted against the force of a spring into the container and can be locked there by locking means in a storage position. By pressing the magnetic tape cassette again, the locking means is released, so that the spring pushes the slider and the magnetic tape cassette on it forwards into a removal position. In the removal position of the slider, the magnetic tape cassette can be removed by hand. This type of cassette holder and a container for storing magnetic tape cassettes are described in European Patent 0 538 585 A2.

If this type of cassette holder is used, for example in a motor vehicle, then motions including vibrations occurring during travel can lead to undesirable rattling noises due to motions of the cassette in the cassette holder. For that reason, clamping means which clamp the magnetic tape cassette firmly in the storage position in the cassette holder can be provided.

SUMMARY OF THE INVENTION

It is an object of the present invention to provide a holder for a sound recording medium housing, especially for a magnetic tape cassette having clamping means, particularly for securing the cassette in the cassette holder against vibration, which clamping means can be operated by the existing spring used for ejection of the magnetic tape cassettes.

According to the invention, the holder for a sound recording medium housing comprises a base plate; a slider slidably mounted on the base plate for motion between a storage position and a removal position; releasable locking means for releasably locking the slider in the storage position; spring means for urging the slider from the storage position to the removal position; and clamping means for clamping the sound recording medium housing on the slider to avoid rattling noises due to occurrence of motion including vibrations. The clamping means comprises an actuating element mounted on the slider, a clamp element associated with the actuating element and means for pressing the actuating element against the clamp element to secure the sound recording medium housing on the slider when the slider is in the storage position so as to prevent rattling of the sound recording medium housing.

The spring means can also act as the means for pressing the actuating element against the clamping element so that in the storage position the spring force is able to act by means of this actuating element on the clamp element of the clamping means. In the removal position, the spring means no longer presses against the actuating element, so that clamping of the magnetic tape cassette does not occur and the cassette can easily be removed. In a preferred embodiment the clamp element is wedge-shaped and pivotally mounted on the slider, and forms a one-piece plastic part together with the slider. The actuating element can be a push rod, which presses the wedge-shaped clamp element laterally against the inserted magnetic tape cassette when the slider is in the storage position. The wedge-shaped clamp element can be embodied especially simply in this manner, the plastic material being sufficiently resilient to allow deflection of the wedge-shaped clamp element on the one hand and on the other hand the automatic return of the wedge-shaped clamp element when the slider is in the removal position.

It is especially advantageous to use a torsion spring as the spring means, which bears with one spring arm on the rear side of the cassette holder, while the other spring arm acts on the actuating element. Here, the spring arm acting on the actuating element projects beyond this element, so that its free end rests against the rear side of the slider. As a result, although in the removal position there is still a pressure force coming from the spring on the slider, the actuating element is located in a neutral position without being affected by a spring force so as to be disengaged from the clamp element.

BRIEF DESCRIPTION OF THE DRAWING

The objects, features and advantages of the present invention will now be illustrated in more detail by the following detailed description, reference being made to the accompanying drawing in which:

FIG. 3 is a perspective view of a container in which six cassette holders according to FIG. 1 are provided.

DESCRIPTION OF THE PREFERRED EMBODIMENTS

Figure 1:
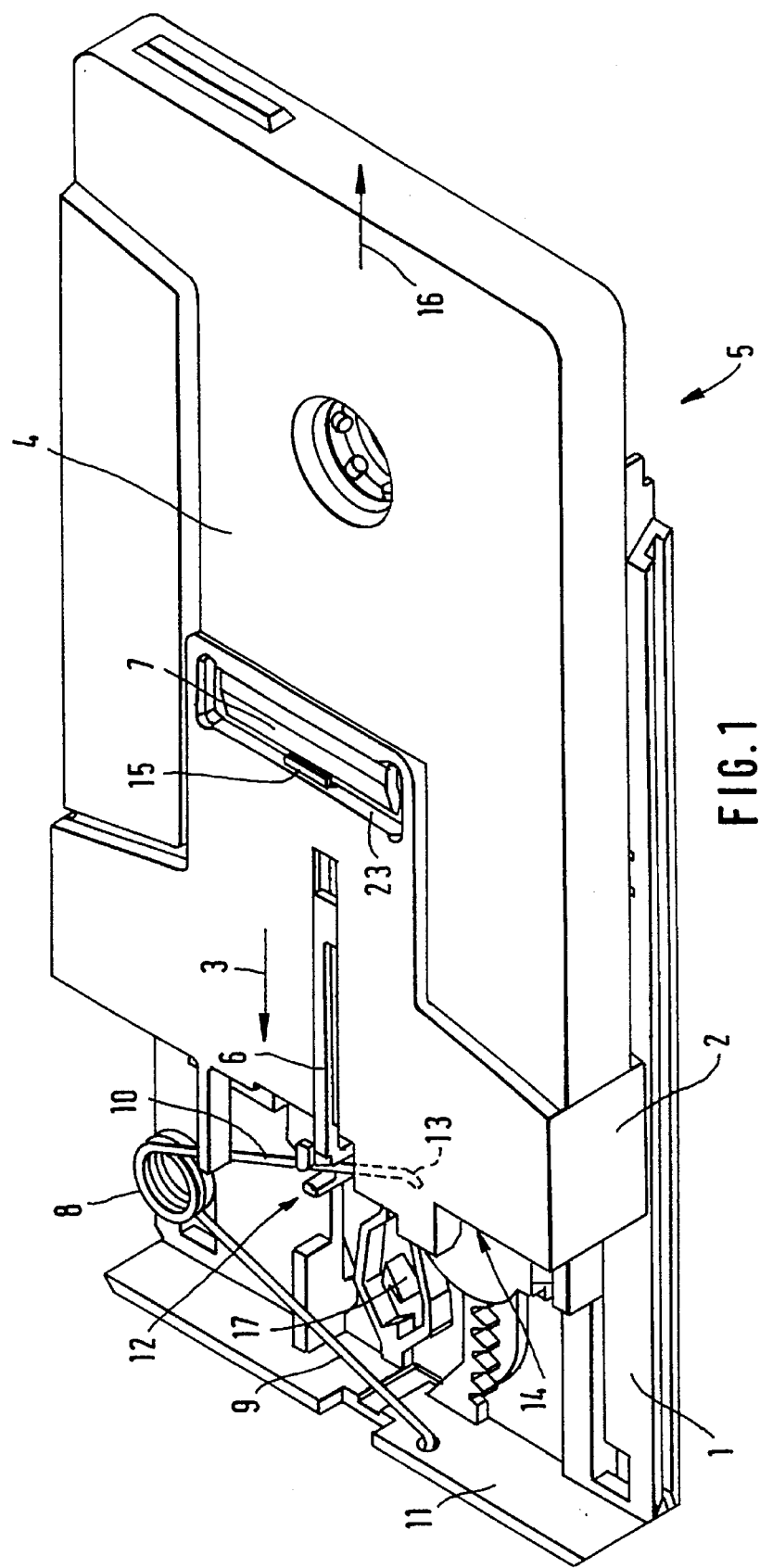
FIG. 1 is a perspective view of a cassette holder according to the invention, in which the slider is located in the removal position.

The cassette holder illustrated in FIG. 1 has a base plate 1 and a slider 2 displaceable in the longitudinal direction 3 relative to the base plate 1. The slider 2 is located in the removal position in which a magnetic tape cassette 4 held in the slider 2 projects from the front side 5 of the holder. A clamping means consisting of a push rod 6 and a wedge-shaped clamp element 7 is provided on the slider 2. The push rod 6 forms the actuating element of the clamping means, while the wedge-shaped clamp element 7 is the clamp for the cassette in the clamping means. A spring 8 in the form of a torsion spring acts as a spring means on the rear end of the push rod 6. At the rear, the spring 8 is secured with one 9 of its two spring arms 9, 10 to a rear wall 11, while the other spring arm 10 engages through a receiving part 12 of the push rod 6. The free end 13 of the spring arm 10 presses against the rear side 14 (not visible in the drawing) of the slider 2.

In FIG. 1, the push rod 6 is located in a neutral position, so that its front end 15 does not come into contact with the wedge-shaped clamp element 7. The wedge-shaped clamp element 7 is thus also in a neutral position, so that the magnetic tape cassette 4 can be removed unhindered from the slider 2 in the direction of arrow 16 or reinserted again in the reverse direction.

Figure 2:
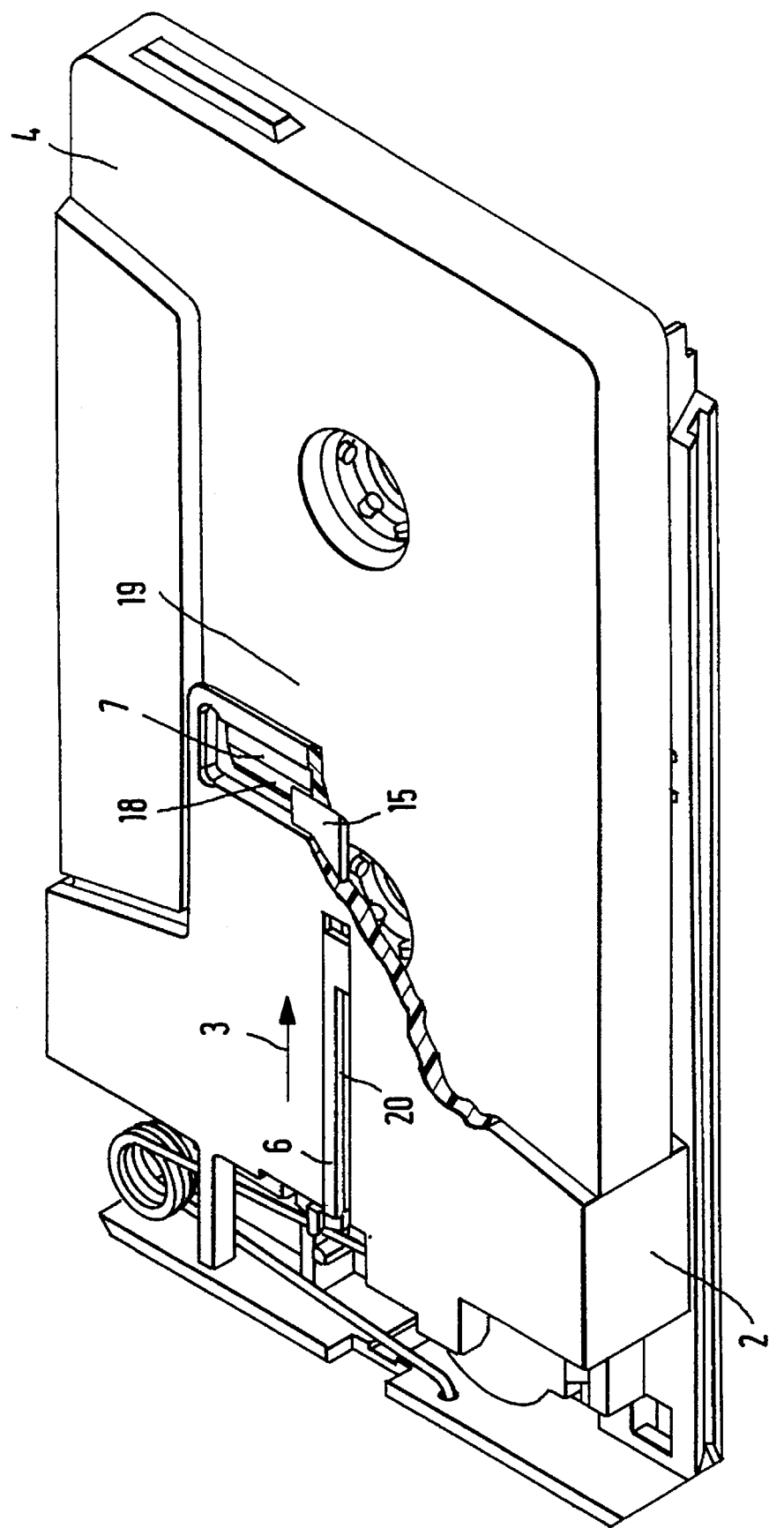
FIG. 2 is perspective view of a cassette holder of FIG. 1, but with the slider in the storage position.

In FIG. 2, the magnetic tape cassette 4, and consequently also the slider 2, are in the storage position. The slider 2 is locked by locking means 17 in this position (FIG. 1). In this position, the spring arm 10 presses the push rod 6 forwards against the wedge-shaped clamp element 7. The beveled surface 18 of the clamp element 7 is pressed by the front end 15 of the push rod 6 against the upper side 19 of the magnetic tape cassette 4. The push rod 6 is guided in a longitudinal groove 20 in the slider 2. In FIG. 2 it is clear that the receiving part 12 projecting from the rear of the push rod projects only slightly from the rear side 14 of the slider 2.

The structure of the cassette holder shown in FIG. 1 and FIG. 2 can be repeated many times in a container 21, which is illustrated in FIG. 3. The container 21 has altogether six receiving compartments 22, each of which is able to accommodate a cassette holder according to the invention as shown in FIGS. 1 and 2. The magnetic tape cassette 44 illustrated in FIG. 3 is located in the removal position, as also illustrated in FIG. 1. By inserting the magnetic tape cassette 44 into the container 21, it arrives at a storage position, in which the slider 2 (FIG. 2) is locked by means of the locking arrangement 17 (FIG. 1). By renewed brief pressure on the magnetic tape cassette 44, the locking means 17 is released and the magnetic tape cassette 44 is pushed out into the removal position by the spring 8.

In the embodiment illustrated in FIG. 1 and FIG. 2, the slider 2, together with the wedge-shaped clamp element 7, are part of a one-piece plastic part. A U-shaped aperture 23 surrounds the wedge-shaped clamp element 7, which is resiliently pivotable.

While the invention has been illustrated and embodied in a cassette holder having clamping means, it is not intended to be limited to the details shown, since various modifications and composition changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is new and desired to be protected by Letters Patent is set forth in the appended claims:

1. A holder for a sound recording medium housing comprising a base plate (1); a slider (2) mounted on said base plate (1) so as to be movable between a storage position and a removal position; releasable locking means (17) for releasably locking said slider (2) in said storage position; spring means (8) for urging said slider (2) from said storage position to said removal position; and clamping means for securing said sound recording medium housing on said slider (1) and for preventing rattling noise due to occurrence of motions including vibration, wherein said clamping means comprises a clamp element (7) on the slider (2), an actuating element (6) engageable with the clamp element (7) and means for pressing said actuating element (6) against said clamp element (7) to press said clamp element (7) against said sound recording medium housing on said slider and thus prevent said rattling noise, when said slider is in the storage position.

2. The holder according to claim 1, wherein said actuating element (6) comprises a push rod extending in a direction in which said slider (2) travels from said storage position to said removal position and said clamp element (7) is wedge-shaped, extends transversely across the slider (2) and is pivotably connected to said slider (2) so that when the push rod engages said clamp element said clamp element is pivoted to contact and press said sound recording medium housing on the slider (2).

3. The holder according to claim 2, wherein said clamp element (7) and said slider (2) are part of a one-piece plastic part, said plastic part is provided with a U-shared aperture surrounding said clamp element (7) and said clamp element (7) is resiliently connected with said slider (2).

4. The holder according to claim 2, wherein the slider (2) is provided with a longitudinal groove (20) extending in said travel direction of said slider and the actuating element (6) is guided in said longitudinal groove (20) provided in the slider (2), projects from a rear side (14) of the slider (2) and said means for pressing said actuating element (6) against said clamp element (7) includes said spring means (8), said spring means (8) being engaged with said actuating element (6).

5. The holder according to claim 1, having a rear end and wherein said spring means (8) comprises a torsion spring having two spring arms (9,10), one (9) of said spring arms being secured at the rear end and another (10) of the spring arms having a free end (13) and bearing on the actuating element (6), the free end (13) projecting beyond the actuating element (6) and resting against a rear side (14) of the slider (2) so that said means for pressing said actuating element (6) against said clamp element (7) includes said spring means (8).

6. A holder according to claim 1, further comprising means for releasing said clamp element (7) from said sound recording medium housing when said slider (2) is in the removal position, said means for releasing including means for disengaging the actuating element (6) from the clamp element (7) when the slider (2) is in the removal position.

7. Container for a plurality of said sound recording medium housings comprising a plurality of said holders as defined by claim 1.

8. A holder for a sound recording medium housing comprising a base plate (1); a slider (2) mounted on said base plate (1) so as to be displaceable between a storage position and a removal position; releasable locking means (17) for releasably locking said slider (2) in said storage position; spring means (8) for urging said slider (2) from said storage position to said removal position; and clamping means for securing said sound recording medium housing on said slider (1) to prevent rattling noise due to occurrence of motions including vibration, wherein said clamping means comprises a wedge-shaped clamp element (7) pivotally connected to the slider (2) and extending transversely across said slider (2), an actuating element (6) comprising a push rod extending in a travel direction of said slider (2) from said storage position to said removal position; and means for displacing said actuating element (6) relative to said slider (2) so as to engage said push rod with said clamp element (7) and for pressing said actuating element (6) against said clamp element (7) to pivot said clamp element (7) and press said clamp element (7) on said sound recording medium housing to secure said sound recording medium housing on said slider, thus preventing said ratting noise, when said slider is in the storage position.

9. The holder according to claim 8, wherein said clamp element (7) and said slider (2) are part of a one-piece plastic part, said plastic part is provided with a U-shaped aperture surrounding said clamp element (7) and said clamp element (7) is resiliently connected with said slider (2).

10. The holder according to claim 8, wherein the slider (2) is provided with a longitudinal groove (20) extending in said travel direction of said slider, the actuating element (6) is guided in said longitudinal groove (20) provided in the slider (2), projects from a rear side (14) of the slider (2), said spring means (8) is engaged with said actuating element and said means for displacing said actuating element (6) and for pressing said actuating element against said clamp element (7) includes said spring means (8).

11. The holder according to claim 8 having a rear end and wherein said spring means (8) comprises a torsion spring having two spring arms (9,10), one (9) of said spring arms being fixed to said rear end and another (10) of the spring arms having a free end (13) and bearing on the actuating element (6), said free end (13) projecting beyond the actuating element (6) and resting against a rear side (14) of the slider (2) so that said means for displacing said actuating element (6) and for pressing said actuating element (6) against said clamp element (7) includes said spring means (8).

* * * * *